Sept. 11, 1928.  T. TESHIMA  1,683,933
ARTIFICIAL BAIT
Filed June 1, 1927
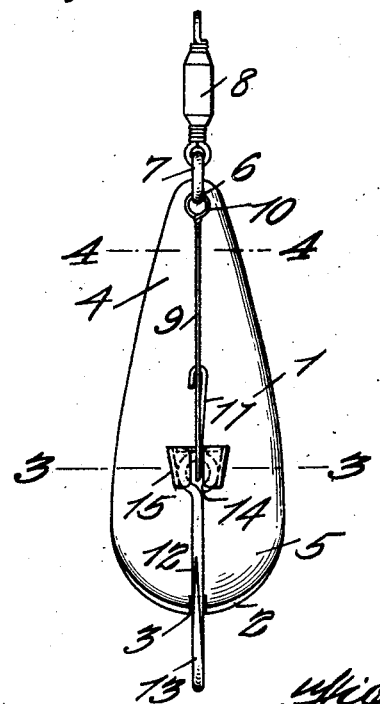
Fig. 1.
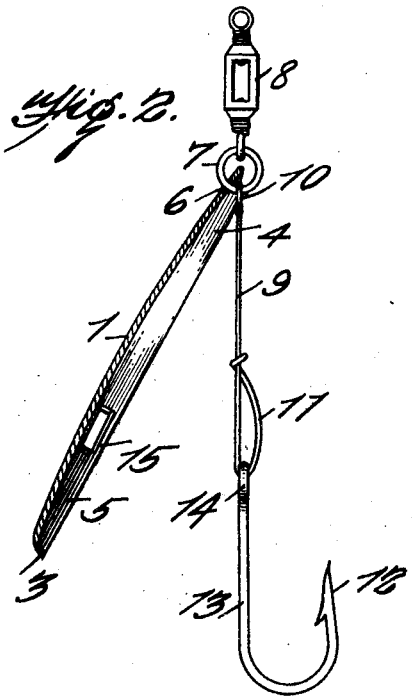
Fig. 2.
Fig. 3.
Fig. 4.
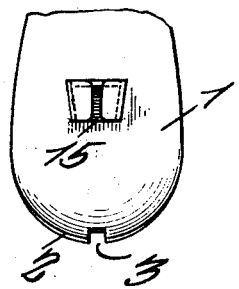
Fig. 5.
INVENTOR.
TADATAKA TESHIMA,
BY D. E. Lofgren
ATTORNEY.

Patented Sept. 11, 1928.

1,683,933

UNITED STATES PATENT OFFICE.

TADATAKA TESHIMA, OF PORTLAND, OREGON.

ARTIFICIAL BAIT.

Application filed June 1, 1927. Serial No 195,846.

This invention relates to an improvement in artificial bait designed particularly for use in connection with hand fishing for large fish, such as salmon.

The primary object of the present invention is the provision of a bait of this character involving a spoon and a hook, the spoon being designed to receive and hold the hook temporarily in comparatively rigid or fixed relation to the spoon, with the hook extending beyond the end of the spoon, the holding means yielding under the pull exerted on the hook when the fish is impaled thereon to free the hook from the spoon while still maintaining the hook connected to the line. The hook is thus compelled to follow closely the movements of the spoon while attracting the fish and is thereafter released from its rigid connection with the spoon to avoid holding the hook in a manner which will afford sufficient resistance to the hook movement to allow the fish to disgorge the hook.

The invention is illustrated in the accompanying drawings, in which:

Figure 1 is a bottom plan view showing the hook in rigid relation to the spoon as when using the bait to attract the fish.

Figure 2 is an edge view with the spoon in section, showing the hook disconnected from the spoon as when the fish is impaled on the hook.

Figure 3 is a section on line 3—3 of Figure 1.

Figure 4 is a section on line 4—4 of Figure 1.

Figure 5 is a broken bottom plan view of the spoon with the hook omitted to indicate the notch in the spoon for receiving the shank of the hook.

The improved artificial bait comprises a spoon 1 which, as usual, is of highly polished metal and of somewhat pear shape in plan, the line-connected end being of materially less width than the hook-connected end. The spoon may be curved longitudinally and its rear edge 2 is deflected downwardly and formed with a notch 3 for a purpose which will later appear.

A characteristic feature of the spoon is that the transverse curvature adjacent the line-connected end is, as indicated at 4, on a less radius than the curvature at the hook-connected end, as indicated at 5; that is to say, the spoon in the forward portion is of more pronounced curvature transversely than in the rear portion.

The forward end of the spoon is formed with an opening 6 to receive a ring 7 to which is connected the swivel 8 for the line attachment. The ring 7 is also provided with a wire connector 9 for the hook. This wire connector is formed with a ring terminal 10 to loosely engage the ring 7 and a loop 11 to which the hook is loosely connected, the terminal of the loop being hooked around the main length of the connector to permit the convenient application or removal of the hook.

The hook is of the usual type comprising the pointed bill 12, the shank 13 and an eye 14 at one end of the shank, which eye loosely engages the loop 11 in order that the hook may be directly connected to the line through the swivel 8, ring 7 and connector 9.

The under surface of the spoon is provided at an appropriate point with what may be termed a pocket to receive the eye of the hook. This pocket, preferably a strip of metal 15, is rigidly secured to the under surface of the spoon with its ends 16 formed in return bends and terminally spaced apart to provide a pocket-like formation in which the eye of the hook may be inserted. This pocket is forwardly convergent, as clearly indicated in the drawings, in order that, as the eye is inserted beneath the ends 16, there is a wedging cooperation between the hook eye and the side walls of the pocket to both limit the forward movement of the hook and more or less fixedly grip the same. The forward end of the pocket is closed in part by a wall 17, centrally formed with a notch 18, the later receiving the lower strand of the loop 11 when the hook eye is in the pocket, as later explained.

The pocket is arranged in such relation to the notch 3 that when the hook eye is inserted in the pocket, the shank of the hook will seat in the notch. This holds the hook rigidly with the spoon, with the bill of the hook projecting rearwardly beyond the rear end of the spoon and the hook end proper underlying and spaced from the spoon. The connector is held with the lower strand of loop 11 in the notch 18 of wall 17, thus holding the connector in proper relation to avoid engagement with the parts of the pocket in the removal of the hook.

It is to be particularly noted that the connector 9 is of such length that when the hook is inserted in the pocket, as described, the connector will be without any holding effect on the hook, that is, the distance between the ring 7 and the eye of the hook is less than the length of the connector. This is an important detail for a purpose which will later appear.

It is noted that when the hook is connected to the spoon, the loop of the connector rests at right angles to the plane of the spoon, the upper strand of the loop passing between the ends 16 of the pocket, with the lower strand fitting in notch 18 of wall 17.

In use, it is of course apparent that in the disposition of the hook, any usual type of natural bait may be applied thereto which will trail behind the spoon. By reason of the sectional formation of the spoon described, there is an increased wabbling effect of the spoon as it is trolled through the water, thereby increasing its attractiveness as a lure. When the fish takes hold of the hook and exerts the necessary endwise pull thereon, the hook is detached from the pocket and moves freely for the slight distance permitted by the excess length of the connector. This comparatively free movement of the hook results in a sharp and sudden resistance to the hook movement as it reaches the limit of the connector and this tends to more effectively embed the hook in the mouth of the fish. Immediately the hook is freed from the spoon, there is a direct line connection leading to the hook wholly and entirely independent of the spoon, and the fish may be handled and landed exactly as if the spoon did not exist.

What I claim to be new is:

In combination with a spoon, a line connection at one end thereof, a notch formed at the opposite end thereof, a hook-receiving pocket secured to the under surface of the spoon, comprising a metal clip having its free ends bent inwardly toward each other and the edges thereof inclined to form a tapered inlet opening for the hook and a bevelled depression formed in a flange secured within the metal clip, said depression being in line with the tapered opening of the clip, said pocket being adapted to receive one end of the hook through the tapered opening in the clip and held in the depresison by the inwardly bent ends of the latter with the shank of the hook disposed in said notch, and a connector between the hook and line connection, said connector having a length exceeding the distance between the line connection and hook when the latter is in the pocket and terminally formed to provide a loop with which the hook may be removably engaged.

In testimony whereof I affix my signature.

TADATAKA TESHIMA.